United States Patent [19]

Moy et al.

[11] Patent Number: 5,456,897
[45] Date of Patent: Oct. 10, 1995

[54] FIBRIL AGGREGATES AND METHOD FOR MAKING SAME

[75] Inventors: David Moy, Winchester; Asif Chishti, Lowell, both of Mass.

[73] Assignee: Hyperlon Catalysis Int'l., Inc., Cambridge, Mass.

[21] Appl. No.: 284,917

[22] Filed: Aug. 2, 1994

Related U.S. Application Data

[63] Continuation of Ser. No. 855,122, Mar. 18, 1992, abandoned, which is a continuation of Ser. No. 413,837, Sep. 28, 1989, abandoned.

[51] Int. Cl.[6] .................................................... D01F 9/12
[52] U.S. Cl. ...................... 423/447.3; 423/447.1; 423/447.2; 264/29.2; 428/367
[58] Field of Search .............................. 423/447.1, 447.2, 423/447.3; 428/337, 367, 408, 903; 427/216, 249, 255.1; 264/29.1

[56] References Cited

U.S. PATENT DOCUMENTS

| | | | |
|---|---|---|---|
| 3,655,498 | 4/1972 | Woodell | 264/205 |
| 3,816,609 | 6/1974 | Hamner . | |
| 3,964,933 | 6/1976 | Fung . | |
| 4,518,575 | 5/1985 | Porter . | |
| 4,565,683 | 1/1986 | Yates . | |
| 4,565,684 | 1/1986 | Tibbetts . | |
| 4,568,592 | 2/1986 | Kawaguchi et al. | 252/514 |
| 4,572,813 | 2/1986 | Arakawa | 423/447.3 |
| 4,583,299 | 4/1986 | Brooks . | |
| 4,591,334 | 5/1986 | Brooks . | |
| 4,642,125 | 2/1987 | Burk et al. . | |
| 4,650,657 | 3/1987 | Brooks . | |
| 4,663,230 | 5/1987 | Tennent . | |
| 4,710,483 | 12/1987 | Burk et al. . | |
| 4,738,828 | 4/1988 | Brooks . | |
| 4,743,431 | 5/1988 | Brooks . | |
| 4,770,867 | 9/1988 | Coulon et al. . | |
| 4,780,363 | 10/1988 | Evans et al. . | |
| 4,816,289 | 3/1989 | Komatsu et al. . | |
| 4,855,091 | 8/1989 | Gevs et al. | 423/448 |
| 4,861,575 | 8/1989 | Levan | 423/447.2 |
| 4,876,078 | 10/1989 | Arakawa et al. | 423/447.3 |
| 4,923,637 | 5/1990 | Yagi et al. | 423/447.3 |
| 5,165,909 | 11/1992 | Tennent et al. | 502/182 |
| 5,171,560 | 12/1992 | Tennent | 502/159 |

FOREIGN PATENT DOCUMENTS

| | | |
|---|---|---|
| 0198558 | 10/1986 | European Pat. Off. . |
| 024566 | 9/1981 | Japan . |
| 56-3149 | 7/1982 | Japan . |
| 59-152299 | 2/1983 | Japan . |
| 1469930 | 4/1977 | United Kingdom . |
| 8701317 | 12/1987 | WIPO . |
| 8900322 | 8/1989 | WIPO . |

OTHER PUBLICATIONS

De Bokx et al., J. Catal. 96:454 (1985).
Boellaard et al., J. Catal. 96:481 (1985).
Baker et al., J. Catal. 64:464 (1980).
Baker et al., Carbon 21:463 (1983).
Tibbetts, SAMPE Journal (Sep./Oct. 1986) pp. 30–35.
Tibbetts et al., Carbon 25:367–75 (1987).
"Beacon Gas Conversion Process Yields Useful Carbon Materials" R&D (1987).

*Primary Examiner*—Anthony McFarland
*Attorney, Agent, or Firm*—Curtis Morris & Safford; Barry Evans

[57] ABSTRACT

A fibril aggregate that includes a multiplicity of carbon fibrils whose longitudinal axes have substantially the same relative orientation, each of the fibrils characterized as having graphitic layers that are substantially parallel to its longitudinal axis and being free of a continuous thermal carbon overcoat, and a method of preparing such aggregates.

15 Claims, No Drawings

FIBRIL AGGREGATES AND METHOD FOR MAKING SAME

This is a continuation application of Ser. No. 07/855,122, filed Mar. 18, 1992, now abandoned, which is a continuation application of Ser. No. 07/413,837, filed Sep. 28, 1989, now abandoned.

BACKGROUND OF THE INVENTION

This invention relates to preparing carbon fibrils.

Carbon fibrils are carbon microfibers having diameters less than 500 nanometers. They may be prepared by contacting a metal-containing catalyst with a carbon-containing gas at elevated temperatures.

SUMMARY OF THE INVENTION

In a first aspect, the invention features a fibril aggregate that includes a multiplicity of carbon fibrils whose longitudinal axes have substantially the same relative orientation, each of the fibrils characterized as having graphitic layers that are substantially parallel to its longitudinal axis and being free of a continuous thermal carbon overcoat (i.e. pyrolytically deposited carbon resulting from thermal cracking of the gas feed used to prepare the fibrils). One aspect of substantial parallelism is that the projection of the graphitic layers on the fibril's longitudinal axis extends for a relatively long distance in terms of the external diameter of the fibril (e.g., at least two fibril diameters, preferably at least five diameters), as described in Snyder et al., U.S. Ser. No. 149,573 filed Jan. 28, 1988 refiled as continuation application Ser. No. 494,894, filed Mar. 13, 1990, refiled as continuation application Ser. No. 694,244, filed May 1, 1991 and entitled "Carbon Fibrils" which is assigned to the same assignee as the present application and hereby incorporated by reference. Carbon fibrils having substantially parallel graphitic layers are also described in Tennent, U.S. Pat. No. 4,663,230 ("Carbon Fibrils, Method for Producing Same and Compositions Containing Same"), Tennent et al., U.S. Ser. No. 871,676 filed Jun. 6, 1986, refiled as continuation application Ser. No. 593,319 filed Oct. 1, 1990, now U.S. Pat. No. 5,165,909, issued Nov. 24, 1992 ("Novel Carbon Fibrils, Method for Producing Same and Compositions Containing Same"), Tennent et al., U.S. Ser. No. 871,675 filed Jun. 6, 1986 refiled as continuation application Ser. No. 492,365 filed Mar. 9, 1990, now U.S. Pat. No. 5,171,560, issued Dec. 15, 1992 ("Novel Carbon Fibrils, Method for Producing Same and Encapsulated Catalyst"), Mandeville et al., U.S. Ser. No. 285,817 filed Dec. 16, 1988, refiled as continuation application Ser. No. 746,065, filed Aug. 12, 1991, refiled as continuation application Ser. No. 08/284,855, filed Aug. 2, 1994 ("Fibrils"), and McCarthy et al., U.S. Ser. No. 351,967 filed May 15, 1989, refiled as continuation application Ser. No. 823,021, refiled as continuation application Ser. No. 117,873, refiled as continuation application Ser. No. 08/329,774, filed Oct. 27, 1994 ("Surface Treatment of Carbon Microfibers"), all of which are assigned to the same assignee as the present application and are hereby incorporated by reference.

In preferred embodiments, the diameters of at least 90% (and, more preferably, substantially all) of the fibrils in the aggregate have diameters between 3.5 and 75 nanometers, inclusive. Similarly, at least 90% (and, more preferably, substantially all) of the individual fibrils in the aggregate have a length to diameter ratio of at least 5. The diameter of the aggregate preferably is between 0.05 and 50 µm, inclusive, and the length preferably is between 0.1 and 1000 µm, inclusive.

In a second aspect, the invention features a process for preparing an aggregate of carbon fibrils by contacting a particulate metal catalyst deposited on a support having one or more readily cleavable planar surfaces and a surface area of at least 1 m²/g with a carbon-containing gas in a reactor at reaction conditions including temperature sufficient to produce the aggregate.

In preferred embodiments, the support is a metal oxide, e.g., γ-alumina or magnesia, both of which are in the form of aggregates of tabular, prismatic, or platelet crystals. Preferred catalysts include iron. They may further include at least one element chosen from Group V (e.g., vanadium), VI (e.g., molybdenum, tungsten, or chromium), VII (e.g., manganese), or the lanthanides (e.g., cerium). Also preferred are catalysts that include cobalt, nickel, manganese, or a combination of copper and zinc. The catalysts may be prepared using either aqueous or non-aqueous solvents.

Preferred reaction temperatures are between 400° and 850° C., more preferably between 600° and 750° C. Preferred aggregates are those aggregates described above in which the longitudinal axes of the fibrils making up the aggregate all have substantially the same relative orientation.

The invention also features a particulate, carbon fibril-forming, metal catalyst deposited on a support having one or more readily cleavable planar surfaces and a surface area of at least 1 m²/g. Preferred catalyst and support materials are those described above.

The invention provides a process for preparing fibril aggregates in which the texture of the aggregate is controlled by the choice of catalyst support. Using supports having one or more readily cleavable planar surfaces produces fibril aggregates having the appearance of combed yarn in which the individual fibrils are straight to slightly bent or kinked. Aggregates having loose, open mat textures in which the individual fibrils are straight to slightly bent or kinked may also be produced. These aggregates are readily dispersed, making them useful in composite fabrication where uniform properties throughout the structure are desired. The substantial linearity of the individual fibril strands also makes the aggregates useful in EMI shielding and electrical applications, e.g., the devices described in Friend et al., U.S. Ser. No. 08/284,738, filed Aug. 2, 1994, which is a continuation of U.S. Ser. No. 07/692,849 filed Apr. 25, 1991 entitled "Battery", which is a continuation of Friend et al., U.S. Ser. No. 07/413,844 filed Sep. 28, 1989 now abandoned, and Friend et al., U.S. Ser. No. 07/602,446 filed Oct. 23, 1990, now U.S. Pat. No. 5,110,693, issued May 5, 1992, entitled "Electrochemical Cell" which is a continuation of Friend et al., U.S. Ser. No. 07/413,838 now abandoned, all of which are assigned to the same assignee as the present application and are hereby incorporated by reference in their entirety.

Other features and advantages of the invention will be apparent from the following description of the preferred embodiments thereof, and from the claims.

DESCRIPTION OF THE PREFERRED EMBODIMENTS

We now describe the structure and preparation of preferred fibril aggregates.

Structure

Preferred fibril aggregates consist of bundles of straight to slightly bent or kinked carbon fibrils in which the individual fibrils have substantially the same relative orientation, e.g., the longitudinal axis of each fibril (despite individual bends or kinks) extends in the same direction as that of the surrounding fibrils in the bundle. This arrangement of individual fibrils gives the aggregates the appearance of combed yarn, in contrast to aggregates such as those produced according to the process described in the aforementioned Snyder et al. application, U.S. Ser. No. 149,573, in which the fibrils are randomly entangled with each other to form tightly entangled balls of fibrils resembling bird nests.

The carbon fibrils within each fibril aggregate preferably have diameters between about 3.5 and 75 nanometers, length to diameter ratios of at least 5, and graphitic layers that are substantially parallel to the longitudinal fibril axis, and are also substantially free of a continuous thermal carbon overcoat, as described in Tennent, U.S. Pat. No. 4,663,230;Tennent et al., U.S. Ser. No. 871,676; Tennent et al., U.S. Ser. No. 871,675; Snyder et al., U.S. Ser. No. 149,573; and Mandeville et al., U.S. Ser. No. 285,817. The aggregates may also be treated to introduce oxygen-containing functional groups onto the surface of individual fibrils, as described in McCarthy et al., U.S. Ser. No. 351,967. Within each fibril aggregate, the diameters and length to diameter ratios of the individual fibrils are essentially uniform.

A second type of fibril aggregate consists of straight to slightly bent or kinked fibrils which are loosely entangled with each other to form an "open mat" structure. The degree of entanglement is greater than observed in the combed yarn aggregates (in which the individual fibrils have substantially the same relative orientation) but less than that of the tightly entangled fibril balls formed according to the process described in Snyder et al., U.S. Ser. No. 149,573.

Preparation

In general, both the combed yarn and open mat aggregates are prepared by contacting an iron or iron-containing metal catalyst particle deposited on a support material having one or more readily cleavable surfaces and a surface area of at least 1 $m^2/g$ with a carbon-containing gas in a reactor at 400°–850° C. using the procedures described in the aforementioned Tennent patent and Tennent, Snyder, and Mandeville applications.

Preferred support materials include γ-alumina or magnesia in the form of aggregates of tabular, prismatic, or platelet crystals. Such material is commercially available, e.g., from Strem Chemicals (in the case of γ-alumina) and Alfa Inorganics (in the case of magnesia). The γ-alumina supports yield primarily combed yarn aggregates, while the magnesia supports yield primarily open mat aggregates. In contrast, the use of supports consisting of spherical particles or aggregates lacking cleavable planar surfaces (e.g., supports made of Degussa fumed alumina as described in the aforementioned Snyder et al. application) leads primarily to tightly entangled fibril balls.

While not wishing to be limited to any particular theory, it is believed that the readily cleavable planar surfaces of the support allow the fibrils to assist each other as they grow, creating a "neighbor effect" that, in the case of the γ-alumina support, leads to a combed yarn fibril aggregate in which the individual fibrils have the same relative orientation. Spherical supports, on the other hand, lack this effect, leading to tightly entangled balls of randomly oriented fibrils. The magnesia support, although having readily cleavable planar surfaces, yields primarily lightly entangled, open mat fibril aggregates because it breaks apart more readily than the γ-alumina support during fibril growth, resulting in aggregates that are less ordered than the combed yarn aggregates but more ordered than the tightly entangled fibril balls. The oxide precursors used to generate the metal catalyst particles also affect the tendency of the support to break apart. The more readily the oxide and support can form a mixed oxide at the interface between them, the more likely the support is to break apart.

The following examples describe the preparation of combed yarn and open mat fibril aggregates.

EXAMPLE 1

This example describes the preparation of combed yarn fibril aggregates.

200 gm of γ-alumina (Strem Chemicals) was heated at 230° C. in a vacuum oven under reduced pressure (25 in. mercury vacuum) for 5 hrs. Next, it was slurried at room temperature with a solution containing 200 gm $Fe(NO_3)_3.9H_2O$ in 800 $cm^3$ methanol and the slurry agitated thoroughly for 1 hr. The methanol was then removed in a rotary evaporator by gradually reducing pressure and increasing temperature to boil off the methanol at a reasonable rate; final conditions were 25 in. mercury vacuum and temperature less than or equal to 55° C. The stripping process took approximately 45 minutes.

After the methanol had been removed, the remaining solids were dried at 160° C. under reduced pressure (15–20 in. mercury vacuum) in a vacuum oven overnight; the typical catalyst yield after drying was 270 gm. Iron loadings were calculated from starting amounts of $Fe(NO_3)_3.9H_2O$ and final weights of dried catalysts. Typical iron loadings ranged from 8–11%.

Fibrils were grown at 680° C. in a 1 in. quartz tube inserted into an electrical furnace. The catalyst was introduced into the reactor at 680° C. as a free-flowing powder in a preheated gas stream consisting of 2 parts ethylene and 1 part hydrogen at a flow rate of about 2 liters/min., and deposited on a quartz wool plug placed in contact with a thermocouple in the center of the tube.

In a typical run, 0.100 gm catalyst yielded approximately 1.0 gm carbon fibrils after 4 hrs. at run conditions. The yield of carbon fibrils is expressed as a factor times the weight of catalyst or the weight of iron. Typical yields for this catalyst were 10–11 times based on catalyst and 100–125 times based on iron. Examination of the fibrils using electron microscopy (SEM and STEM) revealed the fibrils to be present as aggregates of straight to gently curving fibrils having the appearance of skeins of brushed or combed yarn. The aggregates generally were still attached to the alumina support.

EXAMPLE 2

15.10 gm of γ-alumina (Strem Chemicals) was slurried in a solution of 14.9 gm $Co(NO_3)_2.6H_2O$ in 400 $cm^3$ methanol for 1 hour at room temperature. Methanol was then removed under reduced pressure in a rotary evaporator and dried in a vacuum oven as in Example 1. The calculated cobalt loading was 17.2% by weight.

Fibrils were grown at 680° C. according to the procedure described in Example 1. Examination of the fibrils by TEM revealed numerous combed yarn fibril structures in which the individual fibrils were kinked or twisted. The longitudinal axes of the fibrils, however, had the same relative orientation. The fibrils were hollow and had diameters less than 10 nanometers.

EXAMPLE 3

14.3 gm γ-alumina (Strem Chemicals) was slurried in a solution of 8.3 gm $Ni(NO_3)_2 \cdot 6H_2O$ in 400 cm$^3$ methanol for 1 hour at room temperature. Methanol was then removed under reduced pressure in a rotary evaporator and dried in a vacuum oven as in Example 1. The calculated nickel loading was 16.3% by weight.

Fibrils were grown according to the procedure in Example 1. TEM analysis revealed small combed yarn-type aggregates in which the individual fibrils were straight and had diameters of about 15 nanometers.

EXAMPLE 4

16.51 gm γ-alumina (Strem Chemicals) was slurried with a solution of 30.2 gm $Mn(NO_3)_2$ (50% solution in $H_2O$) dissolved in 400 cm$^3$ methanol. Methanol was then removed under reduced pressure in a rotary evaporator and dried in a vacuum oven as in Example 1. The calculated manganese loading was 16.3% by weight.

Fibrils were grown according to the procedure in Example 1. TEM analysis revealed combed yarn-type aggregates in which the individual fibrils were slightly tangled.

EXAMPLE 5

15.11 gm γ-alumina (Strem Chemicals) was slurried with a solution containing 13N8 gm $Cu(NO_3)_2 \cdot 3H_2O$ and 11.1 gm $Zn(NO_3)_2 \cdot 6H_2O$ dissolved in 400 cm$^3$ methanol for 1 hour at room temperature. Methanol was then removed under reduced pressure in a rotary evaporator and dried in a vacuum oven as in Example 1. The calculated zinc and copper loadings were 19.1% and 12.9% by weight, respectively.

Fibrils were grown according to the procedure in Example 1. TEM analysis revealed a mixture of combed yarn-type aggregates in which the individual fibrils were straight and had diameters less than 10 nanometers and hollow, open, straight fibrils with diameters less than 10 nanometers.

EXAMPLE 6

This example describes the preparation of open mat fibril aggregates.

74 gm magnesia platelets (Alfa Inorganics) was slurried with 400 gm deionized water at 65°–70° C. for 1 hr. with rapid stirring in a baffled reactor. A solution of 112 gm $Fe(NO_3)_3 \cdot 9H_2O$ and 5.4 gm $(NH_4)_6 \cdot Mo_7O_{24} \cdot 4H_2O$ in 150 cm$^3$ deionized water was added dropwise over a period of about 1 hr. at 65° C. while maintaining rapid stirring. During the addition, the solids turned chocolate brown.

After addition was complete, the slurry was filtered; the supernatant was colorless (pH=about 5) and the solids were a dark red-brown. After washing several times with deionized water, the solids were dried overnight at 160° C. under reduced pressure (15–20 in. mercury vacuum). A typical yield of dried solids was 105 gm. The solids were then calcined at 400° C. for 4 hrs. to yield 74 gm catalyst. Iron and molybdenum loadings were calculated to be 20.8% and 4.0%, respectively.

Fibrils were grown using the procedure described in Example 1. Typical fibril yields were 20–25 times based on catalyst, 120–150 times based on iron. Examination by electron microscopy (SEM and STEM) showed that the fibrils were present primarily as loose, open mats with lesser amounts of combed yarn aggregates.

Other embodiments are within the following claims.

For example, other suitable support materials include $MoO_3$ and layered clays, e.g., alumina-, silica-, or magnesia-based clays.

We claim:

1. A fibril aggregate comprising a multiplicity of carbon fibrils whose longitudinal axes have substantially the same relative orientation, each of said fibrils characterized as having graphitic layers that are substantially parallel to its longitudinal axis and being free of a continuous thermal carbon overcoat.

2. The fibril aggregate of claim 1 wherein the diameters of at least 90% of the individual fibrils in said aggregate have diameters that are between 3.5 and 75 nanometers.

3. The fibril aggregate of claim 1 wherein the diameters of substantially all of the individual fibrils in said aggregate are between 3.5 and 75 nanometers, inclusive.

4. The fibril aggregate of claim 1 wherein the diameter of said aggregate is between 0.05 and 50 μm, inclusive, and the length of said aggregate is between 0.1 and 1000 μm, inclusive.

5. The fibril aggregate of claim 1 wherein at least 90% of the individual fibrils in said aggregate have a length to diameter ratio of at least 5.

6. The fibril aggregate of claim 1 wherein substantially all of the individual fibrils in said aggregate have a length to diameter ratio of at least 5.

7. A fibril aggregate comprising a multiplicity of carbon fibrils whose longitudinal axes have substantially the same relative orientation, said fibrils automatically align into said relative orientation to form said aggregate, wherein each of said fibrils in said aggregate has graphitic layers substantially parallel to its longitudinal axis and is substantially free of a continuous thermal carbon overcoat.

8. The fibril aggregate of claim 7 wherein the diameters of at least 90% of the individual fibrils in said aggregate have diameters that are between 3.5 and 75 nanometers.

9. The fibril aggregate of claim 7 wherein the diameters of substantially all of the individual fibrils in said aggregate are between 3.5 and 75 nanometers, inclusive.

10. The fibril aggregate of claim 7 wherein the diameter of said aggregate is between 0.05 and 50 μm, inclusive, and the length of said aggregate is between 0.1 and 1000 μm, inclusive.

11. The fibril aggregate of claim 7 wherein at least 90% of the individual fibrils in said aggregate have a length to diameter ratio of at least 5.

12. The fibril aggregate of claim 7 wherein substantially all of the individual fibrils in said aggregate have a length to diameter ratio of at least 5.

13. A fibril aggregate comprising a multiplicity of carbon fibrils whose longitudinal axes have substantially the same relative orientation, each of said fibrils characterized as having graphitic layers that are substantially parallel to its longitudinal axis and being free of a continuous thermal carbon overcoat, wherein at least 90% of the individual fibrils in said aggregate have diameters that are between 3.5 and 75 nanometers, and wherein the diameter of said aggregate is between about 0.05 and 50 μm, inclusive, and the length of said aggregate is between about 0.1 and 1000 μm, inclusive.

14. The fibril aggregate of claim 13 wherein at least 90% of the individual fibrils in said aggregate have a length to diameter ratio of at least 5.

15. The fibril aggregate of claim 13 wherein substantially all of the individual fibrils in said aggregate have a length to diameter ratio of at least 5.

* * * * *

UNITED STATES PATENT AND TRADEMARK OFFICE
CERTIFICATE OF CORRECTION

PATENT NO.   :   5,456,897
DATED        :   October 10, 1995
INVENTOR(S)  :   David Moy and Asif Chishti It is certified that error appears in the above-indentified patent and that said Letters Patent is hereby corrected as shown below:

On the title page, Column 1, for the name of the Assignee, please change "Hyperlon Catalysis Int'l., Inc." to --Hyperion Catalysis Int'l., Inc.--.

Signed and Sealed this

Twentieth Day of August, 1996

Attest:

BRUCE LEHMAN

*Attesting Officer*     *Commissioner of Patents and Trademarks*